United States Patent
Dusanapudi et al.

(10) Patent No.: US 10,169,185 B1
(45) Date of Patent: *Jan. 1, 2019

(54) EFFICIENT TESTING OF DIRECT MEMORY ADDRESS TRANSLATION

(71) Applicant: International Business Machines Corporation, Armonk, NY (US)

(72) Inventors: Manoj Dusanapudi, Bangalore (IN); Shakti Kapoor, Austin, TX (US); Nelson Wu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/675,717

(22) Filed: Aug. 12, 2017

(51) Int. Cl.
| | |
|---|---|
| *G06F 11/22* | (2006.01) |
| *G06F 11/26* | (2006.01) |
| *G06F 12/1081* | (2016.01) |
| *G06F 11/30* | (2006.01) |
| *G06F 13/10* | (2006.01) |
| *G06F 13/28* | (2006.01) |
| *G06F 11/263* | (2006.01) |

(52) U.S. Cl.
CPC ...... *G06F 11/3051* (2013.01); *G06F 11/2205* (2013.01); *G06F 11/26* (2013.01); *G06F 11/2635* (2013.01); *G06F 12/1081* (2013.01); *G06F 13/102* (2013.01); *G06F 13/287* (2013.01)

(58) Field of Classification Search
CPC .. G06F 11/26; G06F 11/2635; G06F 12/1081; G06F 11/2205
See application file for complete search history.

(56) References Cited

U.S. PATENT DOCUMENTS

| | | | |
|---|---|---|---|
| 6,019,501 A * | 2/2000 | Okazaki | G01R 31/31813 714/718 |
| 2006/0075146 A1 | 4/2006 | Schoinas et al. | |
| 2008/0168208 A1* | 7/2008 | Gregg | G06F 9/5077 710/306 |
| 2012/0265916 A1* | 10/2012 | Nordstrom | G06F 13/28 710/308 |
| 2013/0339654 A1 | 12/2013 | Bybell et al. | |
| 2014/0101404 A1 | 4/2014 | Bybell et al. | |
| 2015/0378930 A1 | 12/2015 | Sahita et al. | |
| 2017/0140839 A1* | 5/2017 | Doron | G11C 29/34 |

OTHER PUBLICATIONS

Dusanapudi et al., "Efficient Testing of Direct Memory Address Translation" U.S. Appl. No. 15/849,597, filed Dec. 20, 2017.
IBM, Appendix P—List of IBM Patents or Patent Applications Treated as Related, dated Feb. 1, 2018.

* cited by examiner

*Primary Examiner* — Glenn A. Auve
(74) *Attorney, Agent, or Firm* — Martin & Associates, LLC; Derek P. Martin

(57) ABSTRACT

A circuit and method provide efficient stress testing of address translations in an integrated circuit such as a link processing unit. A random DMA mode (RDM) circuit provides a random input to index into a translation validation table (TVT) that is used to generate the real memory address. The RDM circuit allows testing all entries of the TVT, and thus all DMA modes, regardless of what bus agents are connected to the link processing unit. The RDM circuit may use a multiplexer to select between a runtime input and a random test input provided by the random bit generator. When the link processing unit is in a test mode a mode selection bit is asserted to select the random test input.

11 Claims, 4 Drawing Sheets

EFFICIENT TESTING OF DIRECT MEMORY ADDRESS TRANSLATION

BACKGROUND

1. Technical Field

This disclosure generally relates to testing direct memory address translation, and more specifically relates to efficient testing of direct memory access translation in an integrated circuit such as in a high speed communication link between one or more processors and graphics processing units.

2. Background Art

Integrated circuit testing tools attempt to generate the most thorough and stressful test case for an integrated circuit. In theory, the generated test cases should provide maximum test coverage and should be able to stress various timing scenarios and operations on the integrated circuit. Testing may be performed during development and production. Building test cases to thoroughly test a complicated integrated circuit can be extremely costly in time and resources. Building efficient test code is an important goal of integrated circuit testing.

Direct memory access (DMA) is a feature of computer systems that allows hardware subsystems to access main system memory independent of the central processing unit (CPU). In some high speed systems, a link processing unit is used to interconnect between chips or portions of a chip to provide DMA between the chips while insuring memory coherency. An example use of this link processing unit would be to connect a CPU chip to a cluster of graphics processing unit (GPU) chips. The CPU and GPU cluster have the ability to coherently read and write each other's memory. The GPU can use non-caching (DMA) reads and writes for high bandwidth data moves between GPU memory and CPU memory.

BRIEF SUMMARY

A circuit and method provides efficient stress testing address translations in an integrated circuit such as a link processing unit. A random DMA mode (RDM) circuit provides a random input to index into a translation validation table (TVT) that is used to generate the real memory address. In an illustrated example, the input into the table is normally a partitionable endpoint number (PE#) corresponding to a specific bus agent connected to the system. The RDM circuit allows testing all entries of the TVT, and thus all DMA modes, regardless of what bus agents are connected to the link processing unit. The RDM circuit may use a multiplexer to select between a runtime input and a random test input provided by the random bit generator. When the link processing unit is in a test mode a mode selection bit is asserted to select the random test input.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein relate to a circuit and method for efficient stress testing of address translations in an integrated circuit such as a link processing unit. A random DMA mode (RDM) circuit provides a random input to index into a translation validation table (TVT) that is used to generate the real memory address. In an illustrated example, the input into the table is normally a partitionable endpoint number (PE#) corresponding to a specific bus agent connected to the system. The RDM circuit allows testing all entries of the TVT, and thus all DMA modes, regardless of what bus agents are connected to the link processing unit. The RDM circuit may use a multiplexer to select between a runtime input and a random test input provided by the random bit generator. When the link processing unit is in a test mode a mode selection bit is asserted to select the random test input.

Figure 1:
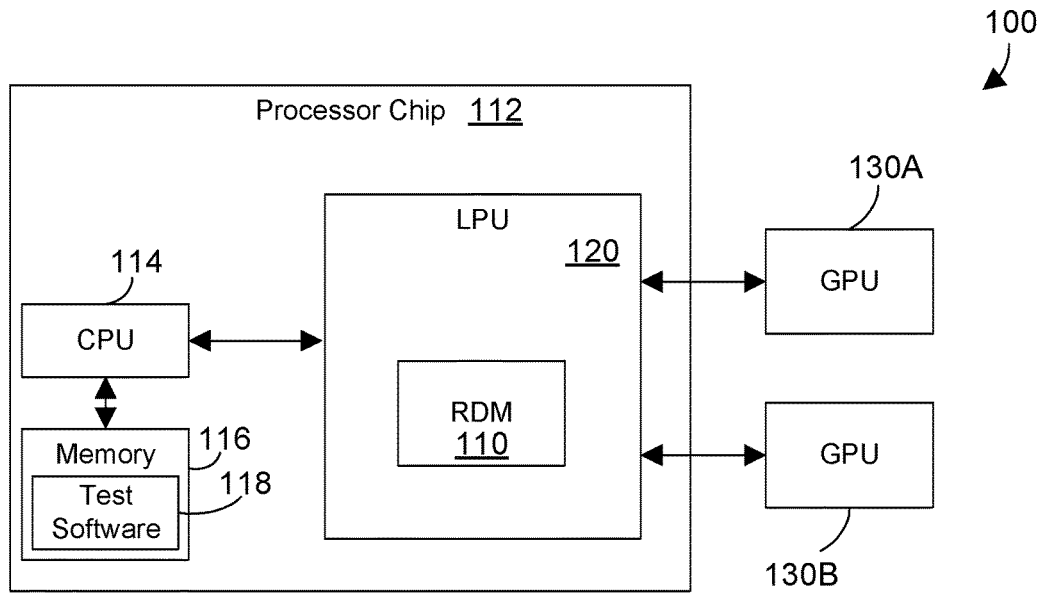
FIG. 1 is a block diagram of a system with a link processing unit having a random DMA mode circuit for efficient testing of DMA address translation on an integrated circuit.

FIG. 1 is a block diagram of a system 100 with a link processing unit (LPU) 120 having a random DMA mode (RDM) circuit 110 for efficient testing of DMA address translations with using DMA access modes as claimed herein. The link processing unit 120 provides a high speed connection to connect one or more central processing units (CPUs) to a cluster of GPUs. In the illustrated example, a single CPU 114 is linked to two GPUs 130A, 130B, collectively referred to as GPU or GPUs 130. In this example, the LPU 120 and the CPU 114 are integrated together and reside on a processor chip 112. The GPUs 130 reside on a separate chip in this example. Alternatively the GPUs 130 may reside on the processor chip 112. The illustrated example includes a memory 116 loaded with test software 118. The memory 116 may be located on the processor chip 112 as shown or may be located off chip. The test software 118 may load the translation tables as known in the prior art. The test software tests the memory while the RDM circuit 110 randomizes the DMA access modes in the tests regardless of what agents are connected as described further below.

An example of a LPU 120 is the Power9 (P9) NV-Link processing unit (NPU) being developed by International Business Machines Corporation. In the examples herein, the LPU 120 is similar to the NPU except for RDM circuit 110 as described herein. The P9 NV-Link processing unit (NPU) uses the NV-Link™ interconnect to connect the central processing unit (CPU) chip 112 to the cluster of GPU chips 130. NV-Link™ (hereinafter NV-Link) is a high speed interconnect architecture owned by NVIDIA Corporation. NV-Link provides memory cache coherence between chips at a very high data bandwidth. The CPU(s) and GPU cluster have the ability to coherently read and write each other's memory. The GPU can use non-caching (DMA) reads and writes for high bandwidth data moves between GPU memory and CPU memory. The NPU provides the transaction layer functionality for the NV-Link(s) for the processor. This functionality includes accepting commands from NV-Link datalink logic, converting them into sequences of bus commands, and then generating responses based on the results of the bus commands. The responses are sent back to the NV-Link through the datalink logic. The supported commands include reads, writes, probes, and flushes. The same types of commands, as well as upgrade and downgrade commands, can be sent by the NPU to the GPU cluster over the NV-Link.

Figure 2:
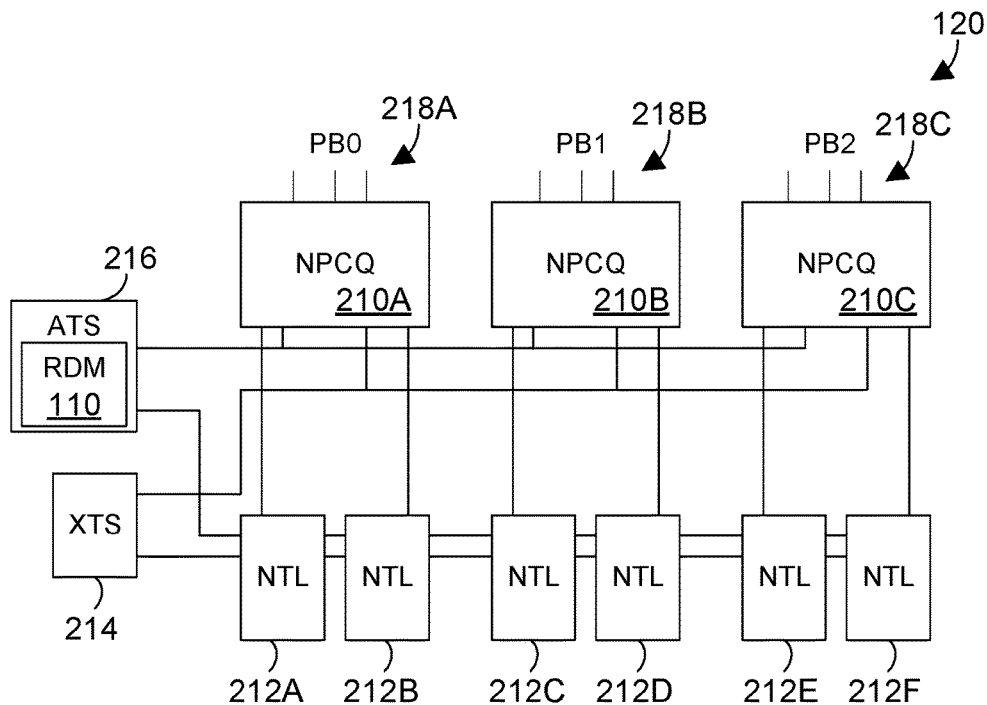
FIG. 2 is a block diagram of a link processing unit having a random DMA mode circuit for efficient testing of DMA address translation.

FIG. 2 is a simplified block diagram of the link processing unit (LPU) 120 introduced in FIG. 1. The major blocks of the LPU 120 include three NPU common queue blocks (NPCQ) 210A, 210B, 210C, six NV-link transaction layer blocks (NTL) 212A-212F, an extended translation service block (XTS) 214 and an address translation block (ATS) 216. As introduced above, the LPU 120 includes a random DMA mode (RDM) circuit 110 for efficient testing of DMA access modes. In this example, the RDM 110 is incorporated into the address translation block (ATS) 216. The ATS 216 provides address relocation and validation when untranslated addresses are used in commands from the GPU. The RDM circuit 110 and the function of the ATS 216 are described further below with reference to FIG. 3.

Again referring to FIG. 2, the LPU 120 includes six NV-link transaction layer blocks (NTL) 212A-212F, collectively referred to as NTL blocks 212. Each of the NTL blocks 212 comprise a unit referred to as a brick. Each brick provides a separate stream of commands to an NV-Link and each brick may be connected to one or more external chips. All ordering requirements are enforced independently for each brick. The LPU 120 further includes three NPU common queue blocks (NPCQ) 210A, 210B, 210C, collectively referred to as NPCQ(s) 210. The NPCQs provide three PowerBus unit interfaces, shown in FIG. 2 as 218A, 218B and 218C. Each of the PowerBus interfaces supports two NV-Link bricks (NTL blocks 212).

Again referring to FIG. 2, the LPU 120 further includes an extended translation services block (XTS) 214. The XTS 214 is used to support the NV-Link's Address Translation Services operations. This block accepts Address Translation Requests from the GPU, looks up the necessary translation context, and creates translation requests for the P9. Translation contexts are kept in a table in the XTS unit. When the Nest MMU responds to a translation request, the XTS block creates an Address Translation Response that will be sent to the GPU over the NV-Link. The XTS block also generates Address Shoot-down Requests based on the snooping of TLBie operations on the PowerBus as known in the prior art.

Figure 3:
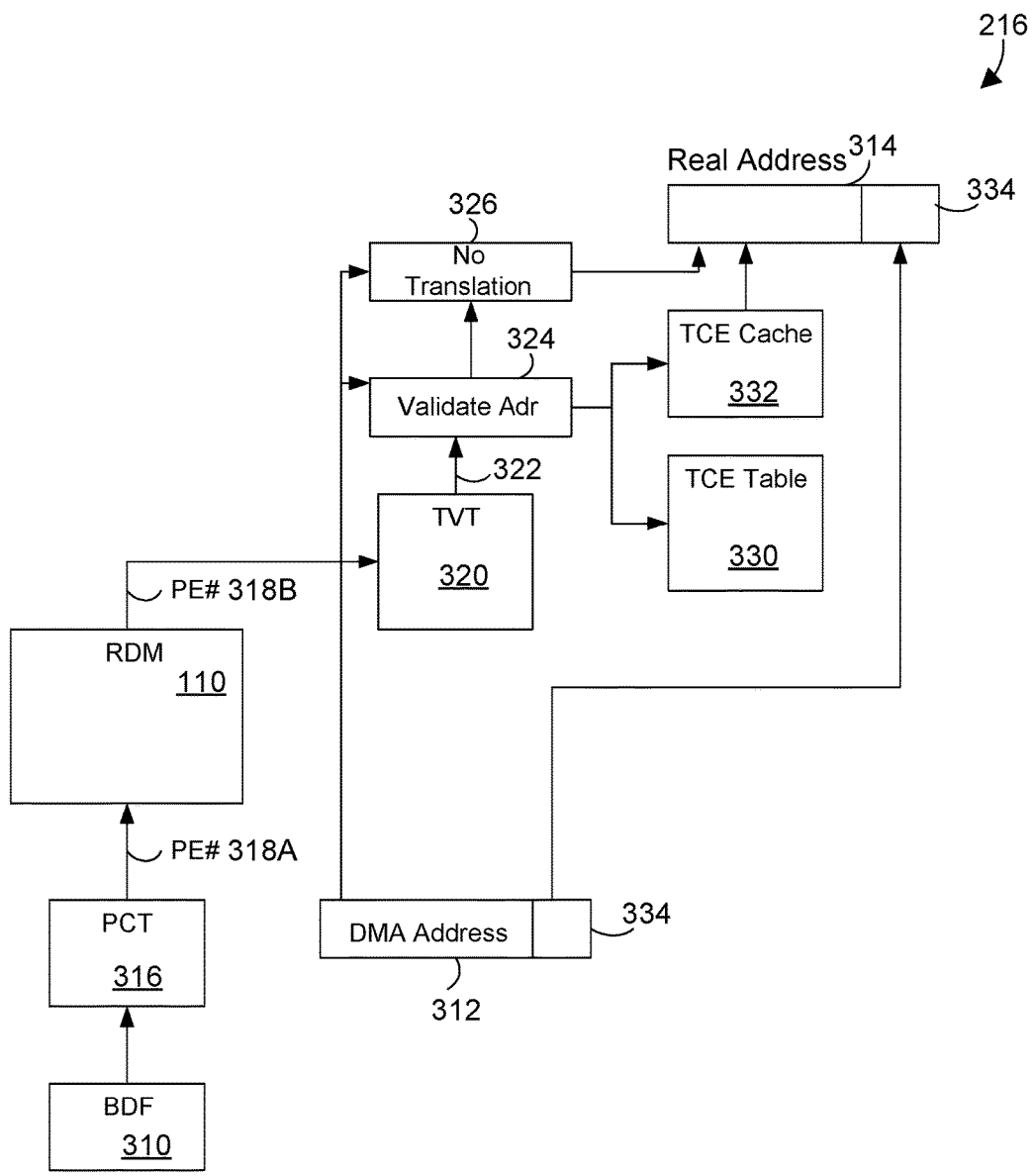
FIG. 3 is a simplified block diagram of a portion of the ATS block shown in FIG. 2 and a specific example of the random DMA mode circuit for efficient testing of DMA address translation.

FIG. 3 is a simplified block diagram of a portion of the address translation block (ATS) 216 introduced in FIG. 2. In this example, the RDM circuit 110 is incorporated into the address translation block (ATS) 216. The ATS 216 provides address relocation and validation when untranslated addresses are used in commands from the GPU. Additional details of the relocation and validation is described in the IO Device Architecture, Version 2 (IODA2) specification owned by OpenPOWER Foundation. The translation process of the ATS 216 starts at the bottom of FIG. 3 with the bus device function (BDF) 310 and DMA address 312 and proceeds to the top to create the system real address 314. Address translation in the ATS 216 has three basic steps. In step 1, a partitionable endpoint number (PE#) 318 is assigned to each address translation operation for a DMA address 312 received from an agent (GPU or CPU) with a bus device function 310. The RDM circuit 110 functions in step 1 as described further below. Steps 2 and 3 operate in a manner similar to the prior art. In step 2, the PE#318 is used to index into a translation validation table (TVT) 320 to find a translation validation entry (TVE). In step 3, the real address 314 is determined using information from TCE table 330 using the TVE and bits 334 from the DMA address 312. Each of these steps will be described further below.

Again referring to FIG. 3, step 1 of the process to translate addresses is to assign a partitionable endpoint number (PE#) to each DMA operation. Normally the same PE# is assigned to all DMA operations associated with a bus device function (BDF). Each DMA operation has an associated agent or agents (GPU or CPU). The bus device function (BDF) 310 indicates the identity of the agent or agents corresponding to the current memory address translation operation. The identity of the device represented by the BDF 310 is typically assigned to the agent in the hardware discovery phase when booting the system. The BDF 310 is used to select a partitionable endpoint number (PE#) that will be used to access the TVT 320 from the PE# configuration table (PCT) 316. In one example, the bits of the BDF 310 are hashed with an exclusive OR operation to form a four bit index that is used to index into the PCT table 316. The PCT 316 is four bits wide and has sixteen entries. Each entry of the PCT contains the PE# associated with the BDF that the DMA command was received from. The PCT 316 outputs a four bit PE#318A. In the normal operation mode, this PE#318A is passed through the RDM circuit 110 as PE#318B and provided to the TVT for step 2 as described below. In a test mode, the RDM circuit 110 randomly changes the PE#318B as described further below.

Again referring to FIG. 3, step 2 of the process to translate addresses uses the PE#318B signal to index into a translation validation table (TVT) 320 to find a translation validation entry (TVE) 322. In this specific example, the TVT 320 is a sixteen entry table with one entry for each PE#. The input to the TVT is the four bit PE#318B signal from the RDM circuit 110 described above. The output of the TVT 320 is a translate validation entry (TVE) 322. The TVE includes a pointer to the translation control entry (TCE) table 330 as described below. In the example described herein, the pointer information in the TVT 320 includes a translation table address (TTA), translation control entry (TCE) tree depth, TCE table size and I/O Page Size. These fields of the TVE 322 are used to index into the TCE table as described further below.

Step 2 of the process continues as follows. Results of decoding the TVE 322 can be the TVE 322 is invalid or the TVE 322 is valid. Where the TVE 322 is valid, the states include whether the translation is disabled or enabled and whether the DMA address falls outside or inside the TCE table range. Bits in the TVE indicate each of the above conditions. The TVE 322 is sent to a validate address block 324. The TVE 322 is used by the validate address block 324 to verify that the DMA address falls within a predefined range. If the DMA address is outside this range, the translation operation fails. If the range test passes, the TVE may specify a "no-translate" mode 326. In this case, the DMA address is used as the system memory address. If "translate" mode is specified, the TVE provides the base address of the TCE table 330 used for step 3 of the translation process. The TVE also specifies an I/O page size to use in step 3.

Again referring to FIG. 3, step 3 of the process of address translation creates the real memory address 314 from information obtained from the translation control entry (TCE) table 330 using the base address from the TVE and bits 334 from the DMA address 312. The bits 334 of the DMA address 312 that are used depends on the I/O page size. The TCE table 330 includes a translation control entry (TCE) for each translation. The TCE entry in the TCE table 330 specifies the real page number bits that replace the high order DMA address bits based on the I/O page size, to form the real memory address 314. The TCE table entry also specifies the access types (read and/or write) that are allowed for an address. Other translation mode information may also be stored in the TCE as known in the prior art. The ATS 216 further contains a cache of TCEs 332 and performs a table search operation when a cache miss occurs.

As used herein, translation mode information is information that is stored and used to translate DMA addresses. In the illustrated examples, translation mode information includes the information in the TCE table 300, and the pointer information in the TVT 320 as described above. It is desirable to test all modes of DMA address translation during testing of the LPU 120 (FIG. 1) using the translation mode information. During a test mode of the LPU 120 (FIG. 1), the TCE table 330 may be loaded with translation mode information to test all modes of address translation. The RDM circuit 110 allows testing of all modes for all the sixteen entries of the TVT 320 by randomly selecting an entry of the TVT as described further below. The TVT 320 provides pointers to index into the TCE table 330 as described above. The mode information is loaded in the TCE table 330 by software in a manner known in the prior art to test the LPU 120. For example, the TCE table 330 may be loaded by an operating system of the CPU, by an application or some other test software. Testing of the device translation then can be done when a single GPU connected to the LPU requests access to memory with an address that is translated as described herein. Methods of verification of the correct translation can be done in a suitable manner as known in the prior art. This could include on chip error detection or test software detection.

Figure 4:
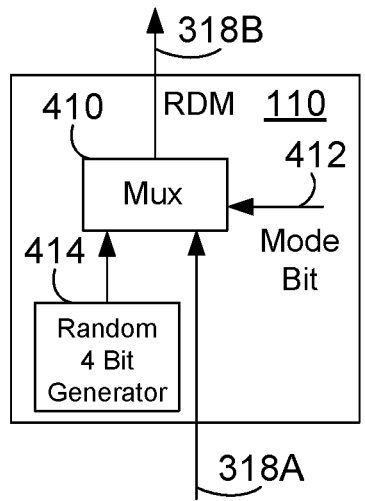
FIG. 4 is a simplified block diagram of one implementation for the random DMA mode (RDM) circuit shown in FIGS. 1-3.

FIG. 4 is a simplified block diagram of a random DMA mode (RDM) circuit 110. The RDM circuit 110 outputs the PE#318B to index into the TVT 320 used to create a real address 314 as described above. FIG. 4 shows an example circuit to provide this operation. In this example, the RDM circuit 110 uses a multiplexer 410 with a mode bit 412 to select between a normal operation mode and a test operation mode. In the normal operation mode, the mode bit 412 of the multiplexer 410 selects the PE#318A input provided from the PCT 316 (FIG. 3). In a test mode of operation, the mode bit 412 selects the output of a random four bit signal generator 414. When the link processing unit is in a test mode the mode bit 416 is asserted to select the input from the random four bit signal generator 414 to apply to the output of the multiplexer 410 which is shown as signal PE#381B. The RDM circuit 110 thus allows testing all entries of the TVT regardless of what bus agents are connected to the link processing unit where the input to the TVT is provided by the random four bit generator 414. The mode bit may be set for the test mode by an appropriate means. For example, the mode bit 412 may be set by the basic input/output system (BIOS) during booting of the integrated circuit.

Figure 5:
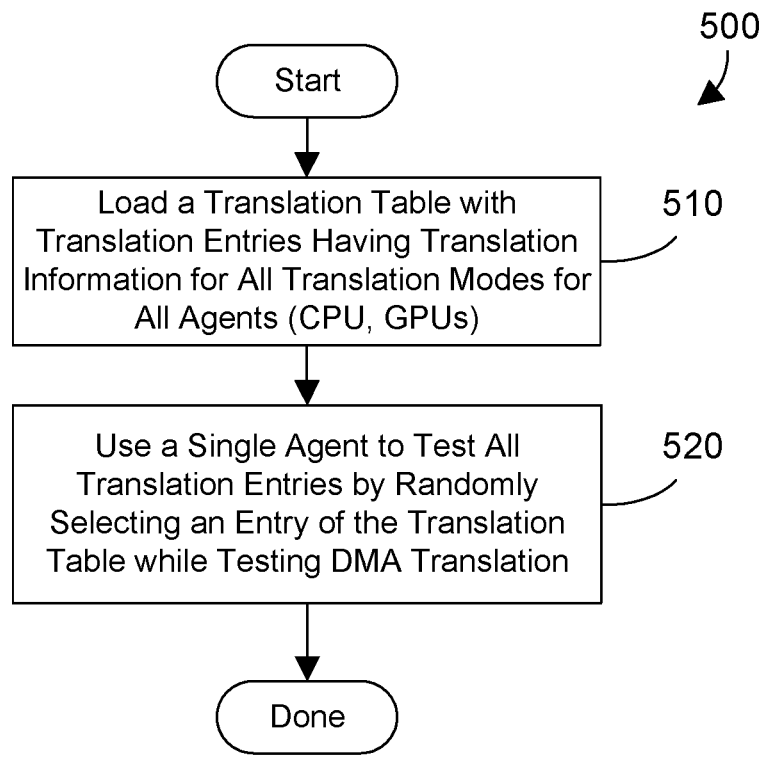
FIG. 5 is a flow diagram of a method for efficient testing of DMA address translation on an integrated circuit.

Referring to FIG. 5, a method 500 shows one suitable example for efficient stress testing of address translations in an integrated circuit such as a link processing unit. Method 500 is preferably performed by LPU 120 in FIG. 1 and the random mode circuit 110 shown in FIG. 4 and by test software 118 shown in FIG. 1. First, load a translation table with translation entries having translation information for all translation modes for all agents (step 510). Then use a single agent (GPU) to test all translation entries by randomly selecting an entry of the translation table while testing DMA translation regardless of what agents are connected (step 520). The method is then done.

Figure 6:
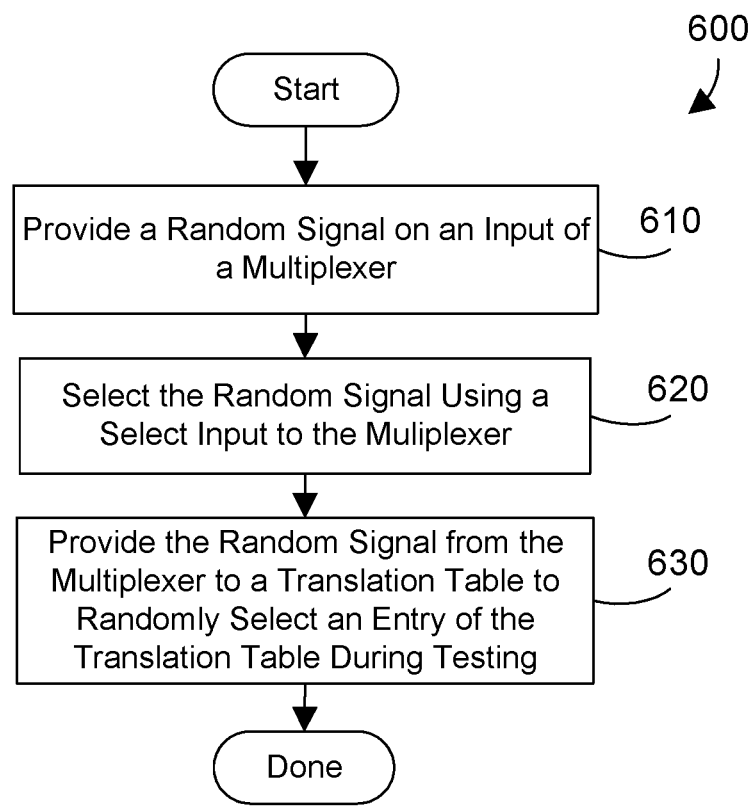
FIG. 6 is a flow diagram of a specific method for step 520 in FIG. 5.

FIG. 6 shows one suitable example of a method for randomly selecting translation types for test DMA translations in an integrated circuit such as a link processing unit. Method 600 thus shows suitable steps for performing step 520 in method 500. First, provide a random signal on an input to a multiplexer (step 610). Select the random signal to output from the multiplexer using a select input of the multiplexer (step 620). Provide the random signal from the multiplexer to a translation table to randomly select an entry of the translation table during testing (step 630). Then the method is then done.

The disclosure and claims herein describe a circuit and method for efficient stress testing of address translations in an integrated circuit with a random DMA mode (RDM) circuit that provides a random input to index into a translation validation table. The RDM circuit allows testing all entries of the translation validation table, and thus all DMA modes, regardless of what bus agents are connected to more efficiently test the integrated circuit.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method of testing an integrated circuit, the method comprising:
    loading a first translation table with a plurality of translation entries, wherein each of the plurality of translation entries contains translation information to translate direct memory access (DMA) addresses for one of a plurality of agents connected to the integrated circuit; and
    using a single agent connected to the integrated circuit in a test mode to test all the translation entries in the translation table by randomly selecting an entry of the table with translation information to run multiple consecutive tests of address translation using the single agent.

2. The method of claim 1 further comprising;
    providing a random signal on an input of a multiplexer;
    selecting the random signal using a select input to the multiplexer; and
    providing the random signal from the multiplexer to the translation table to randomly select an entry of a translation control entry table during the test mode.

3. The method of claim 2 wherein the random signal is four bits and the translation table contains sixteen entries.

4. The method of claim 1 wherein the first translation table is a translation validation table (TVT) which contains translation validation entries for each of the plurality of agents that point to a translation control entry table.

5. The method of claim 4 wherein the translation validation entries comprise a translation table address (TTA), translation control entry tree depth, translation control entry table size and input/output page size.

6. The method of claim 1 wherein the agents comprise a central processing unit and at least one graphics processing unit.

7. The method of claim 1 wherein the method is performed by a link processing unit on an integrated circuit.

8. The method of claim 7 wherein the link processing unit is fabricated on the integrated circuit with a central processing unit.

9. A computer-implemented method of testing a link processing unit on an integrated circuit, the method comprising:

loading a first translation table with a plurality of translation entries, wherein each of the plurality of translation entries contains translation information to translate direct memory access (DMA) addresses for one of a plurality of agents connected to the integrated circuit, wherein the agents comprise a central processing unit and at least one graphics processing unit;

using a single agent connected to the integrated circuit in a test mode to test all the translation entries in the translation table by randomly selecting an entry of the table with translation information to run multiple consecutive tests of address translation using the single agent;

providing a random signal on an input of a multiplexer;

selecting the random signal using a select input to the multiplexer; and providing the random signal from the multiplexer to the translation table to randomly select an entry of a translation control entry table during the test mode.

10. The method of claim 9 wherein the translation table is a translation validation table (TVT) containing translation validation entries for each of the plurality of agents.

11. The method of claim 10 wherein the translation validation entries comprise a translation table address (TTA), translation control entry tree depth, translation control entry table size and input/output page size.

* * * * *